Patented Mar. 11, 1941

2,234,680

UNITED STATES PATENT OFFICE 2,234,680

PROCESS OF PREPARING PANTOTHENIC ACID

Marjorie B. Moore, Waukegan, Ill., assignor to Abbott Laboratories, North Chicago, Ill., a corporation of Illinois No Drawing. Application July 22, 1940, Serial No. 346,807

2 Claims. (Cl. 260—534)

The present invention relates to the process of preparing a complex organic acid known in the art as pantothenic acid.

Pantothenic acid, a member of the class of "B" vitamins may be represented by the following formula:

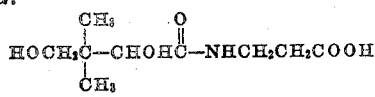

and its synthesis due to its complex structure has presented many difficulties. The presence of various type reactive groups in the molecule, for example, makes the use of acid chlorides extremely difficult and as a result the synthesis of the acid particularly in a satisfactory form for use in the therapeutic field has presented the art with the problem of process of preparation.

The principal object of the present invention is to provide the art with a satisfactory process for the preparation of pantothenic acid resulting in the synthesis of the acid in the desired form for therapeutic use.

Other objects of the present invention will be apparent as the description proceeds.

I have discovered after an extensive research investigation that pantothenic acid may be prepared in the desired form by heating i. e. fusing, B-alanine (B-amino-propionic acid) with a member selected from the group consisting of $\alpha,\gamma$-dihydroxy-B,B-dimethyl-n-butyric acid and $\alpha$-hydroxy-B,B-dimethyl-butyro-$\gamma$-lactone. This method (employing the specified butyric acid or related lactone) has demonstrated that it is free from the objections found in other processes and to result in a yield of final product excellently suited for use in the therapeutic field. The following example will serve for illustrative purposes:

Example

About 130 grams (1 mole) of $\alpha$-hydroxy-B,B-dimethyl-butyro-$\gamma$-lactone and about 89 grams (1 mole) of B-alanine are mixed and gradually heated with occasional stirring. Up to about 178° C. crystals of B-alanine are present and there is no sign of chemical reaction. Around this temperature (i. e. 178° C.), however, the mixture begins to bubble vigorously indicating that a chemical reaction is under way.

The temperature of the reaction mixture is ordinarily maintained at or preferably above 178° C. for about 15 minutes or longer to complete the reaction indicated by no further bubbling. The final liquid reaction product which is almost colorless and does not deposit crystals i. e. remains substantially free from solid material when cooled, may be used directly in the form obtained as further treatment or purification is unnecessary. If desired the final acid product may be reacted to form salts e. g. calcium pantothenate, and be administered in such form.

It will be understood that the present invention is not limited to the above illustrative example. All modifications of the present invention are intended to be covered by the following claims.

I claim:

1. The process of preparing pantothenic acid of the vitamin B complex which comprises fusing a mixture made up of B-alanine and a member selected from the group consisting of $\alpha,\gamma$-dihydroxy-B,B-dimethyl-n-butyric acid and $\alpha$-hydroxy-B,B-dimethyl-butyro-$\gamma$-lactone.

2. The process of preparing pantothenic acid of the vitamin B complex which comprises heating a mixture made up of about molecular proportions of $\alpha$-hydroxy-B,B-dimethyl-butyro-$\gamma$-lactone and B-amino-propionic acid to a temperature of above 178° C. until complete fusion occurs and the resulting liquid reaction product remains substantially free from solid material on standing.

MARJORIE B. MOORE.